United States Patent
Wilson et al.

(10) Patent No.: US 7,044,168 B2
(45) Date of Patent: May 16, 2006

(54) REFRIGERANT HOSE

(75) Inventors: Reji Paul Wilson, Fairlawn, OH (US); Pradeep Dattatraya Nadkarni, DeForest, WI (US); Robert John Kozak, Shandong (CN)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/886,883

(22) Filed: Jul. 8, 2004

(65) Prior Publication Data

US 2005/0011571 A1 Jan. 20, 2005

Related U.S. Application Data

(60) Provisional application No. 60/486,520, filed on Jul. 11, 2003.

(51) Int. Cl.
*F16L 11/00* (2006.01)

(52) U.S. Cl. ............... 138/126; 138/125; 138/137; 428/36.91

(58) Field of Classification Search ............... 138/125, 138/126, 137; 428/36.91
See application file for complete search history.

(56) References Cited

U.S. PATENT DOCUMENTS

| | | | |
|---|---|---|---|
| 4,633,912 A | 1/1987 | Pilkington et al. ........... 138/132 |
| 4,880,036 A * | 11/1989 | Kitami et al. ................ 138/137 |
| 4,881,576 A * | 11/1989 | Kitami et al. ................ 138/125 |
| 5,016,675 A * | 5/1991 | Igarashi et al. ............. 138/125 |
| 5,132,182 A | 7/1992 | Grosse-Puppendahl et al. ........................ 428/475.8 |
| 5,380,571 A * | 1/1995 | Ozawa et al. ............... 428/36.9 |
| 5,462,091 A * | 10/1995 | Saupe ......................... 138/126 |
| 5,488,974 A * | 2/1996 | Shiota et al. ................ 138/125 |
| 5,643,526 A | 7/1997 | Hert et al. .................... 264/476 |
| 6,162,385 A | 12/2000 | Grosse-Puppendahl et al. ........................... 264/250 |
| 6,216,744 B1 | 4/2001 | Leray et al. ................. 138/125 |
| 6,257,281 B1 * | 7/2001 | Nie et al. .................... 138/137 |
| 6,376,036 B1 | 4/2002 | Nadkarni et al. ........... 428/36.2 |
| 6,536,479 B1 | 3/2003 | Wilson et al. ............... 138/137 |
| 2002/0189699 A1 * | 12/2002 | Wilson et al. ............... 138/137 |
| 2004/0058111 A1 * | 3/2004 | Manas-Zloczower et al. ........................ 428/36.91 |
| 2005/0011571 A1 * | 1/2005 | Wilson et al. ............... 138/126 |

* cited by examiner

*Primary Examiner*—James Hook
(74) *Attorney, Agent, or Firm*—John D. DeLong

(57) ABSTRACT

A hose comprising a core layer, an elastomeric friction layer overlaying the core layer, at least one reinforcement layer overlaying the friction layer, and a cover layer overlaying the at least one reinforcement layer, wherein the core layer is comprised of a blend of two different non-plasticized polyamides.

10 Claims, 1 Drawing Sheet

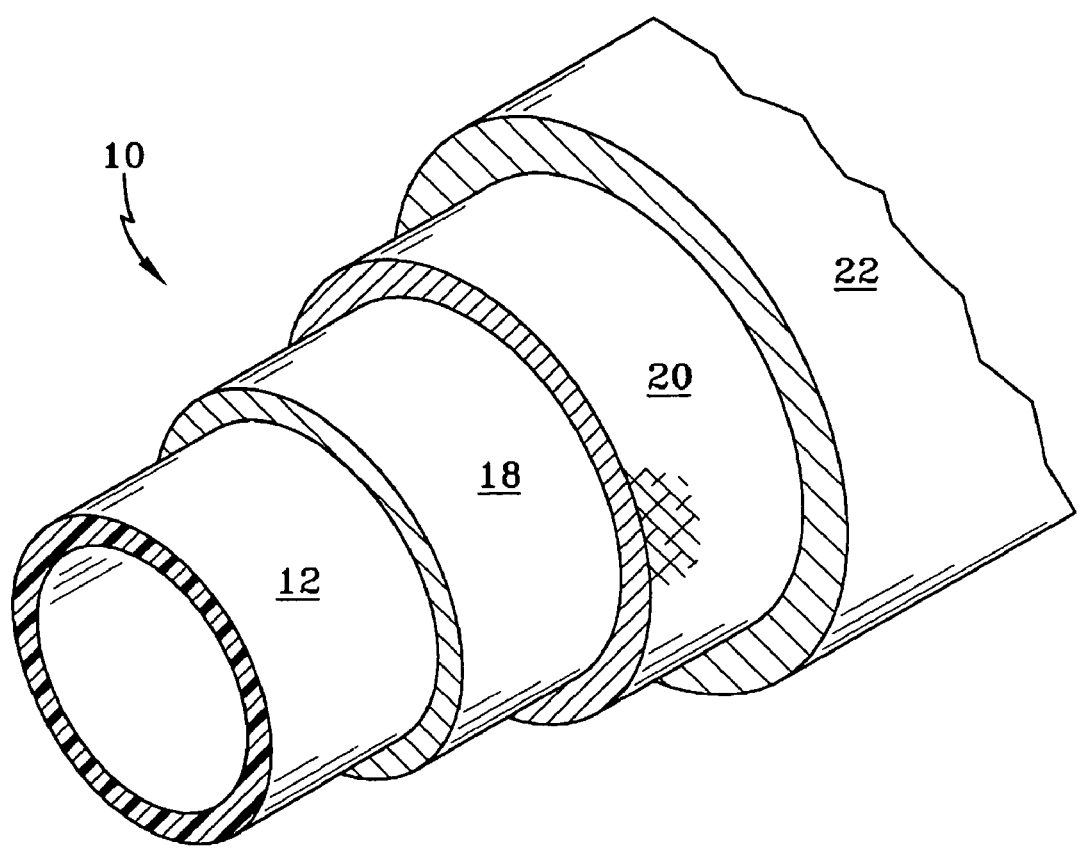

REFRIGERANT HOSE

CROSS-REFERENCE TO RELATED APPLICATION

This application claims the benefit of co-pending Ser. No. 60/486,520, filed on Jul. 11, 2003, fully incorporated herein by reference.

FIELD OF THE INVENTION

The disclosed invention relates to refrigerant hoses for use in automotive and industrial air conditioners.

BACKGROUND OF THE INVENTION

The automotive industry uses hoses for transporting refrigerants. The hoses generally have a three-layer laminar construction consisting of an innermost layer, an outermost cover layer located radially outwardly of the inner tube, and a reinforcing fiber layer interposed between the innermost layer and the outermost layer. Generally, the inner and outer layers are formed of rubber. The reinforcing fiber layer usually is a mesh structure formed by braided organic yarn such as polyester fiber, rayon fiber, or nylon fiber. The outer cover typically is formed of ethylene propylene diene rubber (EPDM) or chloroprene rubber (CR). Adhesion layers be may employed between the layers.

The known multi-layered rubber hoses discussed above have a high degree of flexibility. Because of this property of the rubber materials, rubber hoses can be handled with ease. However, rubber materials generally tend to have high gas permeability. Attempt to improve resistance of conventional rubber hoses to refrigerant permeation by incorporating polyamide layers such as nylon 6 or nylon 66 as an inner layer.

SUMMARY OF THE INVENTION

The present invention is directed to a hose comprising a core layer, an elastomeric friction layer overlaying the core layer, at least one reinforcement layer overlaying the friction layer, and a cover layer overlaying the at least one reinforcement layer, wherein the core layer is comprised of a blend of two different non-plasticized polyamides with flexibility and ultra low permeation.

BRIEF DESCRIPTION OF THE DRAWINGS

The invention will be described by way of example and with reference to the accompanying drawings in which:

FIG. 1 is a perspective view of a hose in accordance with the present invention.

DETAILED DESCRIPTION OF THE INVENTION

The refrigerant hose 10 of the present invention is illustrated in FIG. 1. The hose 10 has a core layer 12, relative to the radial direction of the hose and the longitudinal hose axis. The core layer 12 is formed from a blend a polyamides. Over the core layer 12 is an elastomeric friction layer 18, over which is a reinforcing layer 20, and overall, a cover layer 22.

The core layer 12, as noted, is formed from a blend of two polyamides. Both polyamides are non-plasticized polyamides. Suitable polyamides for use in the core layer 12 include nylon 6 and a copolymer of nylon 6 and nylon 66. In one embodiment, the inner core comprises a blend nylon 6 and a copolymer of nylon 6 and nylon 66 with a weight ratio of nylon 6 to copolymer of nylon 6 and nylon 66 of from about 1 to about 3. In another embodiment, the inner core comprises a blend nylon 6 and copolymer of nylon 6 and nylon 66 with a weight ratio of nylon 6 to copolymer of nylon 6 and nylon 66 of from about 1.5 to about 2.5. Suitable nylon 6 is available from DuPont as FN727. Suitable copolymer of nylon 6 and nylon 66 is available from Atofina. The polyamides may be blended using any of the thermoplastic blending methods as are known in the art, including but not limited to extrusion. The core layer 12 may be extruded from preblended polyamides, or formed directly by extrusion of a mixture of polyamide pellets.

Layer 18 is an elastomeric friction layer between the outermost core layer 16 and the reinforcing layer 20 and provides flexibility to the hose 10. The elastomer selected for this layer should meet those characteristics. For adhesion to the adjacent polyamide layer 16, the elastomeric layer 18 may be extruded onto the core layer 12. The layer may also be applied in the form of a sheet either spirally wrapped or butt seamed. These methods of applying such layers are known in the art, and variations thereof are contemplated herein.

The elastomeric friction layer 18 comprises a base polymer selected from polyisoprene, polybutadiene, copolymers of butadiene and acrylonitrile, copolymers of butadiene and styrene, polychloroprene, polybutadiene, ethylene propylene copolymers, EPDM's such as ethylene propylene norbornene terpolymers, ethylene propylene-1,4-hexadiene terpolymers, ethylene propylene dicyclopentadiene terpolymers and the like. In one embodiment, the base stock for the friction layer is EPDM.

The base polymer in the friction layer 18 must have an adhesive system and a peroxide or sulfur curative. The adhesive systems useful are the conventionally known resorcinol, phenolic, or maleinized polybutadiene based adhesive systems. The resorcinol component may be added to the elastomer in the nonproductive mix, or preformed adhesive resins may be added during the productive mix. The amount of adhesive system utilized in the elastomeric friction layer can range from 1 to 10 parts by weight based on 100 parts of base stock polymer. The peroxide or sulfur curatives useful in the friction layer 18 are those that are normally used in such base stocks. The peroxide or sulfur curatives useful in the elastomeric friction layer are those that are normally used in such base stocks. For example peroxides such as dicumyl peroxide, [α,α'-bis(t-butylperoxide)diisopropylbenzene], benzoyl peroxide, 2,4-dichlorobenzoyl peroxide, 1,1-bis(t-butylperoxy)3,3,5-trimethylcyclohexane, 2,5-dimethyl-2,5-bis(t-butylperoxy)hexane, 2,5-dimethyl-2,5-bis(t-butylperoxy)hexyne-3, and n-butyl 4,4-bis(t-butylperoxy)valerate. From 1 to about 10 parts of peroxide or sulfur are utilized based on 100 parts of base polymer.

The reinforcing layer 20 may be a fiber layer as commonly used as a reinforcing layer for hoses. The layer 20 may be formed by braiding, spiraling, knitting, or helical knitting of yarn. The yarn may be selected from conventional hose reinforcing yarns such as glass, steel, cotton, polyester, or aramid fibers, or a blend of any of these fibers.

The cover layer 22 is selected from known cover layer materials, including but not limited to nitrile-butadiene rubber (NBR), chlorosulfonated polyethylene rubber (CSM), ethylene-propylene-diene rubber (EPDM), butyl rubber (IIR), chlorinated butyl rubber (Cl-IIR), brominated butyl rubber (Br-IIR), epichlorohydrine rubber (CHR, CHC), acrylic rubber (ACM), chloroprene rubber (CR), ethylene-acrylic elastomer (AEM) and the like. In one embodiment, the base stock for the cover layer is AEM.

As discussed above, the hose 10 having core 12 has a low permeation rate with refrigerants. The hose 10 has a permeation rate of less than 0.5 g/m/day, preferably 0.15 to 0.5 g/m/day. A hose with a permeation rate of less than 0.5 is considered an ultra low permeation hose.

EXAMPLE

A hose 10 was built in accordance with the present invention, having a core with a polyamide blend, an EPDM friction layer, an aramid reinforcement, and an AEM cover. The core 12 was formed by extruding a 2 to 1 weight ratio of nylon 6 and nylon 6, 66. The core 12 had a gauge of about 0.3–0.4 mm.

TABLE 1

|  | polyamide 1[1] | polyamide 2[2] | blend |
|---|---|---|---|
| Tensile Strength, MPa | 38 | 70 | 28 |
| % Elongation at Break | 337 | 368 | 243 |
| Permeation Rate*, g/m/day | — | — | 0.23 |

*measured with R134A refrigerant, 10 days at 90° C.
[1]FN727, a nylon 6, obtained from DuPont
[2]non-plasticized copolymer of nylon 6 and nylon 66 obtained from Atofina The hose was tested for 10 days at 90° C. following Volkswagen Specification TL 823 16 to determine the permeation rate. The permeation rate was 0.23 g/m/day, and the exemplary hose is a low permeation hose.

Variations in the present invention are possible in light of the description of it provided herein.

While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A hose comprising a core layer, an elastomeric friction layer overlaying the core layer, at least one reinforcement layer overlaying the friction layer, and a cover layer overlaying the at least one reinforcement layer, wherein the core layer is comprised of a blend of two different non-plasticized polyamides; wherein the two different non-plasticized polyamides are nylon 6 and a copolymer of nylon 6 and nylon 66 and are present in a weight ratio of nylon 6 to copolymer of nylon 6 and nylon 66 from about 1 to about 3; and wherein the hose has a permeation rate of from 0.15 to 0.23 g/m/day.

2. The hose in accordance with claim 1 wherein the two different non-plasticized polyamides are nylon 6 and a copolymer of nylon 6 and a copolymer of nylon 6 and nylon 66 and are present in a weight ratio of nylon 6 to copolymer of nylon 6 and nylon 66 from about 1.5 to about 2.5.

3. A hose in accordance with claim 1 wherein the elastomeric friction layer comprises EPDM.

4. A hose in accordance with claim 1 wherein the cover layer comprises AEM.

5. A hose in accordance with claim 1 wherein the core layer has a gauge of from about 0.3 to about 0.4 mm.

6. A hose in accordance with claim 5 wherein the nylon 6 and a copolymer of nylon 6 and nylon 66 and are present in a weight ratio of nylon 6 to copolymer of nylon 6 and nylon 66 of about 2 to 1.

7. A hose consisting of a core layer, an elastomeric friction layer overlaying the core layer, at least one reinforcement layer overlaying the friction layer, and a cover layer overlaying the at least one reinforcement layer; wherein the core layer consists of a blend of two different non-plasticized polyamides; wherein the two different non-plasticized polyamides are nylon 6 and a copolymer of nylon 6 and nylon 66 and are present in a weight ratio of nylon 6 to copolymer of nylon 6 and nylon 66 from about 1 to about 3; and wherein the hose has a permeation rate of less than 0.5 g/m/day.

8. A hose in accordance with claim 7 wherein the hose has a permeation rate of from 0.15 to 0.23 g/m/day.

9. A hose in accordance with claim 8 wherein the core layer has a gauge of from about 0.3 to about 0.4 mm.

10. A hose in accordance with claim 9 wherein the nylon 6 and a copolymer of nylon 6 and nylon 66 and are present in a weight ratio of nylon 6 to copolymer of nylon 6 and nylon 66 of about 2 to 1.

* * * * *